United States Patent [19]

Ishika

[11] Patent Number: 5,357,102
[45] Date of Patent: Oct. 18, 1994

[54] TILTED LIGHT DETECTION DEVICE FOR PREVENTING UNDESIRABLE RETRO-REFLECTION

[75] Inventor: Sou Ishika, Kawasaki, Japan

[73] Assignee: Kabushiki Kaisha Toshiba, Kawasaki, Japan

[21] Appl. No.: 26,743

[22] Filed: Mar. 5, 1993

[30] Foreign Application Priority Data

Mar. 25, 1992 [JP] Japan .................................. 4-066490

[51] Int. Cl.$^5$ ............................................. H01J 3/14
[52] U.S. Cl. .................................. 250/216; 369/44.24
[58] Field of Search ........................... 250/201.5, 216; 369/44.12, 44.23, 44.24; 359/833, 834, 738, 739, 740

[56] References Cited

U.S. PATENT DOCUMENTS

| | | | |
|---|---|---|---|
| 4,532,619 | 7/1985 | Sugiyama et al. | |
| 5,018,804 | 5/1991 | Jung et al. | 250/201.5 |
| 5,048,783 | 1/1992 | Dewey et al. | 369/44.23 |
| 5,126,988 | 6/1992 | Nishiguma et al. | 369/44.24 |

*Primary Examiner*—David C. Nelms
*Assistant Examiner*—K. Shami
*Attorney, Agent, or Firm*—Cushman, Darby & Cushman

[57] ABSTRACT

A light detection device includes a lens, a photodetector, positioned tilted at a prescribed angle to an incident beam axis, for detecting the incident beam which is incident passing through the lens, and a mask for shading a light reflected by the photo-detector to prevent from returning the reflected light in the direction of the incident beam.

10 Claims, 2 Drawing Sheets

TILTED LIGHT DETECTION DEVICE FOR PREVENTING UNDESIRABLE RETRO-REFLECTION

BACKGROUND OF THE INVENTION

1. Field of the Invention

The present invention relates to a light detection device which is used for an optical disk system, a laser printer, etc.

2. Description of the Related Art

In conventional optical disk system, a light beam irradiated from a semiconductor laser was led to a prism in a light transmission system. The light beam reflected by this prism was led to a photo-detector. The output of semiconductor laser was detected by the photo-detector, and the output light quantity of the semiconductor laser was controlled by this detected quantity. In this case, in order to increase the light reception efficiency of the photo-detector, a convergent lens was provided in front of the photo-detector.

However, when a convergent lens is provided in front of the photo-detector in this way, reflected light from the light receiving face of the photo-detector is led to the reproduction system of the optical disk system via the prism in the light transmission system. Thus, deterioration of the reproduction signal sometimes occurs.

SUMMARY OF THE INVENTION

It is an object of the present invention to provide a light detection device which will prevent light reflected by a light receiving face of a photo-detector from entering other photo-detectors or light detectors.

According to the present invention there is provided a light detection device comprising a lens; means, positioned tilted at a prescribed angle to an incident beam axis, for detecting the incident beam which is incident passing through the lens; and means for shading a light reflected by the detecting means to prevent from returning the reflected light in the direction of the incident beam.

DETAILED DESCRIPTION OF THE PREFERRED EMBODIMENT

Referring to the accompanying drawings, a detailed description will subsequently be given of the preferred embodiment of the present invention.

Figure 1:
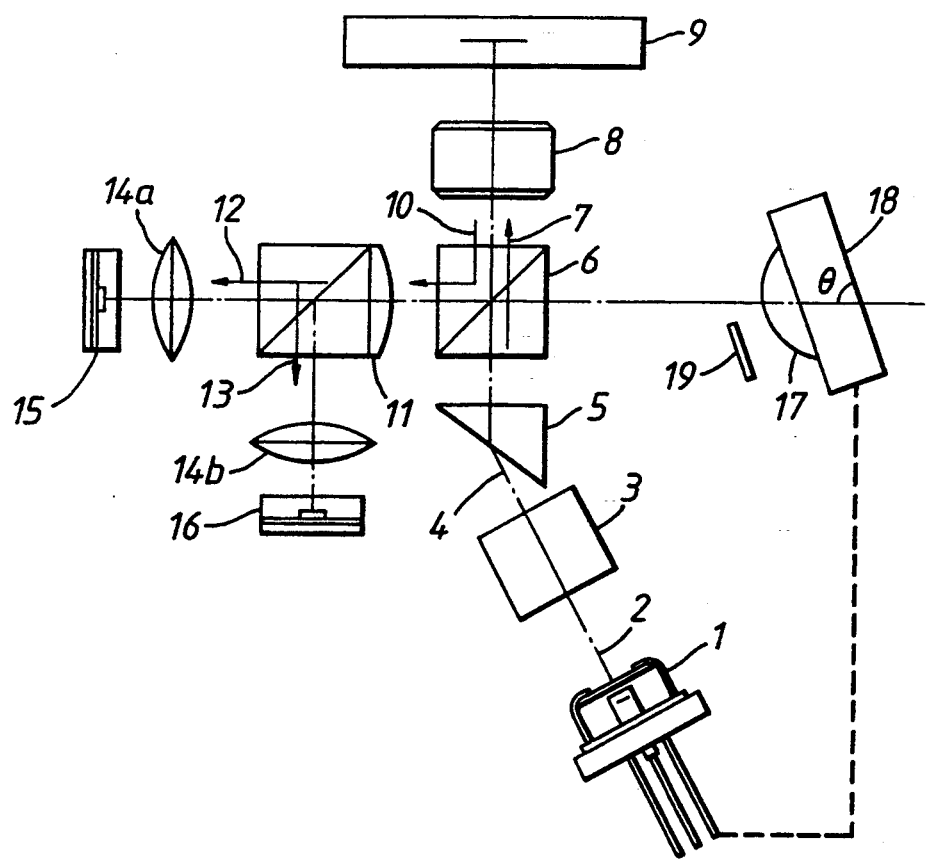
FIG. 1 is a schematic view showing an optical head device as a light detection device according to the present invention.

FIG. 1 is a schematic view showing an optical head device as a light detection device according to the present invention. In FIG. 1, laser beam 2 emitted from semiconductor laser 1, which is driven by a semiconductor laser driving circuit (not shown), becomes collimated light beam 4 by passing through coupling lens 3. The intensity distribution of this light beam 4 is converted from elliptical to circular by passing through elliptical correction prism 5. The beam which has passed through elliptical correction prism 5 is incident upon light transmission system prism 6 which has a polarized beam splitting face. Light beam 7 which has passed through light transmission system prism 6 is converged by passing through objective lens 8. At this time, the light beam is focussed on optical information storage medium 9 by moving objective lens 8 vertically using a focusing actuator coil (not shown).

The light reflected by optical information storage medium 9 becomes collimated light beam 10 through objective lens 8. This light beam is reflected by light transmission system prism 6 toward detection system beam splitter 11. Beams 12 and 13, which have been divided by detection system beam splitter 11, are converged by convergent lenses 14a and 14b on respective optical detectors 15 and 16. Servosignals are produced by electrical circuits (not shown) in response to the converged light. The focusing actuator coil (not shown) is driven in response to these signals, and objective lens 8 is moved in the vertical direction.

In the case of storing information on optical information storage medium 9, signal sources, called are formed along guiding grooves provided on optical information storage medium 9. Therefore, objective lens should be shifted so that light beam 7 converged on optical information storage medium 9 always follows the guiding grooves. In this case also, as described above, servosignals are produced by electrical circuits (not shown) in response to the light converged on optical detectors 15 and 16. A tracking actuator coil (not shown) is driven in response to these signals, and objective lens 8 is shifted.

Part of light beam 2 emitted from semiconductor laser 1 is reflected by light transmission system prism 6, and is led to photo-detector 18 via convergent lens 17. Photodetector 18 detects the output of semiconductor laser 1, and the output light quantity of semiconductor laser 1 is controlled to obtain a suitable light quantity of light by this detected quantity. Convergent lens 17 and photodetector 18 are incorporated and are positioned tilted at angle θ to the incident beam axis.

Mask 19 is provided in front of convergent lens shade. Mask 19 prevents light being reflected toward light transmission system prism 6 out of the light reflected by light receiving face 21 of photo-detector 18.

Figure 2A:
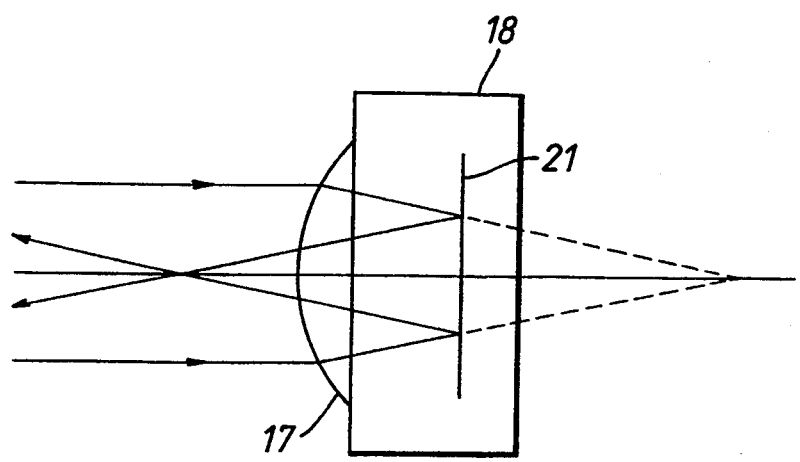
FIG. 2A and 2B are schematic views showing the operating principle of the optical head device of the present invention.
Figure 2B:
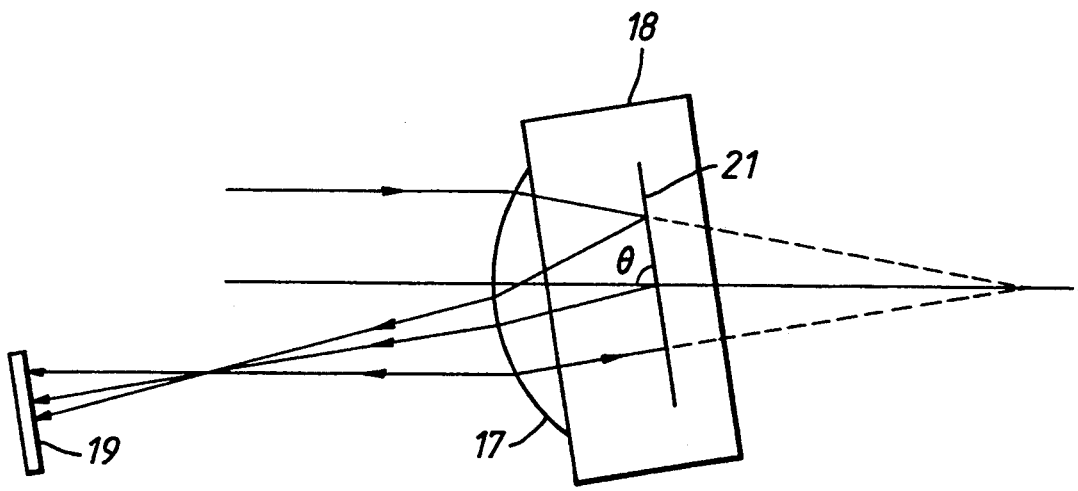

FIG. 2A shows the case when convergent lens 17 and photo-detector 18 are positioned perpendicular to the incident beam axis. FIG. 2B shows the case when convergent lens 17 and photo-detector 18 are positioned tilted at angle θ to the incident beam axis.

When convergent lens 17 and photo-detector 18 shown in FIG. 2A are used in the optical disk system shown in FIG. 1, the light reflected by light receiving face 21 of photo-detector 18 becomes approximately parallel to the optical axis in the vicinity of the center of the light beam. The reflected light travels once more in the direction of light transmission system prism 6 and is detected by optical detectors 15 and 16. Thus it becomes the cause of deterioration of the output signals of optical detectors 15 and 16.

In the case of FIG. 2B, the light in the vicinity of the optical axis passes through the peripheral portion of the incident beam after being reflected by light receiving face 21. Since convergent lens 17 is tilted to the optical axis, the light does not travel toward light transmission system prism 6. The incident light from the peripheral portion of the incident beam is reflected by light receiving face 21 of photo-detector 18. Although there is some light which is almost parallel to the incident beam, any light which would travel toward light transmission system prism 6 is shaded out by providing mask 19 on the peripheral portion of the light beam.

Thus, in this embodiment, photo-detector 18 and convergent lens 17 are positioned tilted to the optical axis, and mask 19 is provided in front of part of convergent lens 17. By this means, reelected light from light receiving face 21 can be prevented from returning in the direction of the incident beam.

The above description is the case of using the light detection device as an optical head device in an optical disk system. However, the present invention can also be applied to other devices, such as a laser printer, etc.

As described above, in the present invention, a light detection device can be provided in which light reflected by the light receiving face of the photo-detector does not enter other photo-detectors or light detectors.

What is claimed is:

1. A light detection device for detecting an incident beam of light, comprising:
    a convergent lens tilted at a prescribed angle to an axis of said incident beam of light, said convergent lens having a focal point at a predetermined distance;
    means, tilted at said prescribed angle to said axis of said incident beam of light, for detecting said incident beam of light passing through said convergent lens, said detecting means having a receiving surface located at a position different than said focal point for receiving said incident beam of light; and
    means for shading a light reflected off of said receiving surface and passing back through said convergent lens so as to prevent said reflected light parallel to said axis of said incident beam of light from returning in the direction of the incident beam.

2. A light detection device according to claim 1, wherein the detecting means includes a photo-detector.

3. A light detection device according to claim 2, wherein the lens and the photo-detector are integrally formed.

4. A light detection device according to claim 1, wherein the shading means includes a mask.

5. A light detection device comprising:
    an optical system for leading a light to an optical information storage medium, the optical system including means for splitting the light into a first light, which is led to the optical information storage medium, and a second light;
    a convergent lens tilted at a prescribed angle to an axis of an incident beam of light comprising the second light, the convergent lens having a focal point at a predetermined distance;
    means, tilted at the prescribed angle to the axis of the incident beam of light, for detecting the second light passing through the convergent lens, the detecting means having a receiving surface located at a position different than the focal point for receiving the incident beam of light; and
    means for shading a light reflected off of the receiving surface and passing back through the convergent lens so as to prevent the reflected light parallel to the axis of the incident beam of light from returning in the direction of the incident beam.

6. A light detection device according to claim 5, wherein the detecting means is operatively connected with the light generating means to control the light generated the generating means based on the detected light.

7. A light detection device according to claim 5, wherein the detecting means includes a photo-detector.

8. A light detection device according to claim 7, wherein the lens and the photo-detector are integrally formed.

9. A light detection device according to claim 5, wherein the shading means includes a mask.

10. A device for detecting a beam of light, comprising:
    a light transmission system for conveying said beam of light;
    a convergent lens;
    means for detecting said beam of light passing through said convergent lens, said detecting means being tilted at a prescribed angle to an axis of said beam of light, and causing an interfering light to reflect off of said detecting means, said interfering light comprising first light reflected back along an axis parallel to said axis of said incident beam of light, and a second light reflected back along an axis non-parallel to said axis of said incident beam of light; and
    means for shading all portions of said interfering light that would otherwise return in a direction of said beam of light and would be incident upon said light transmission system.

* * * * *